Aug. 11, 1953  T. WATT  2,648,577
MOUNTING OF BALL BEARING
Filed Nov. 23, 1948  3 Sheets-Sheet 1
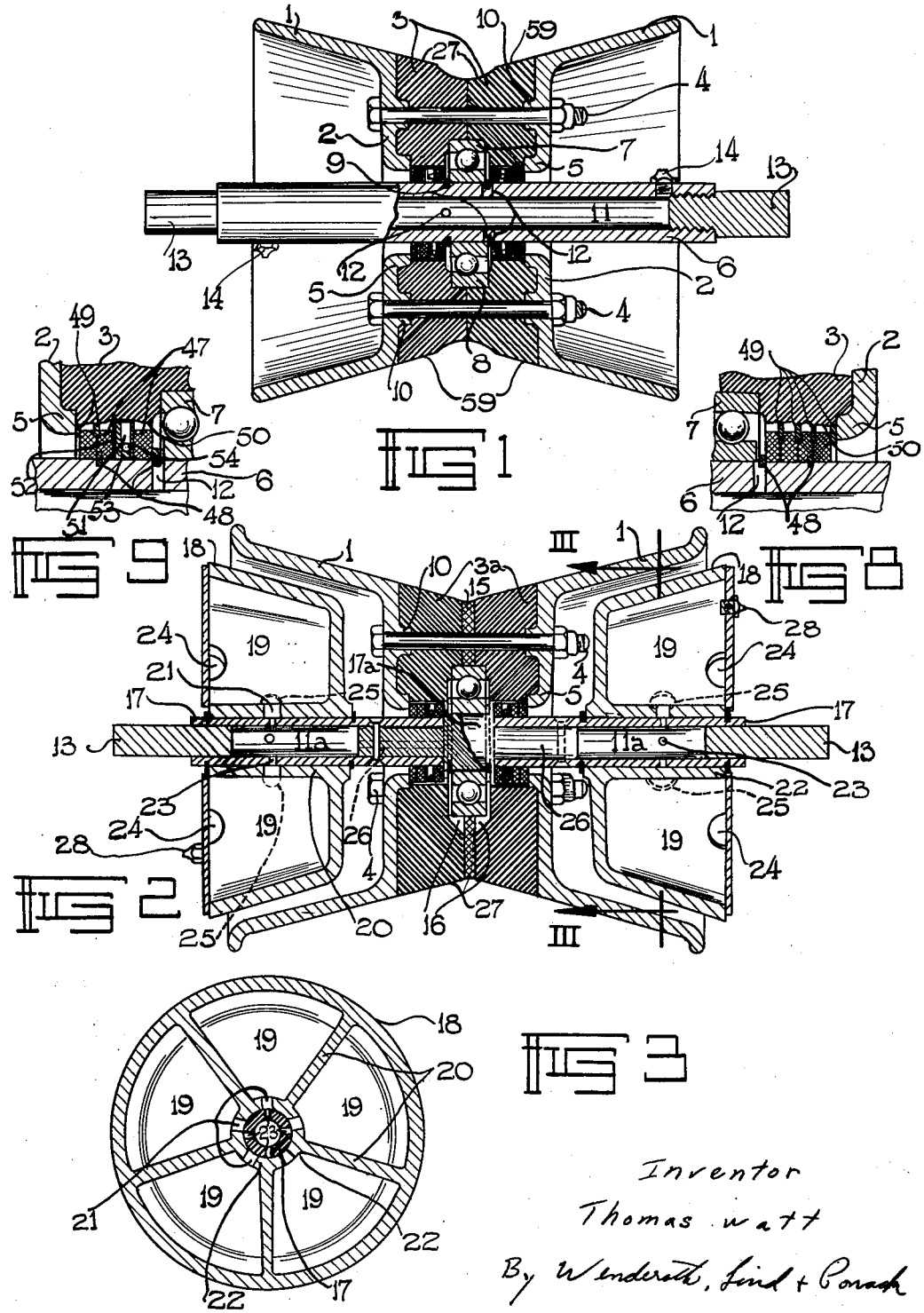
Inventor
Thomas Watt
By Wenderoth, Lind & Ponack
Attorneys

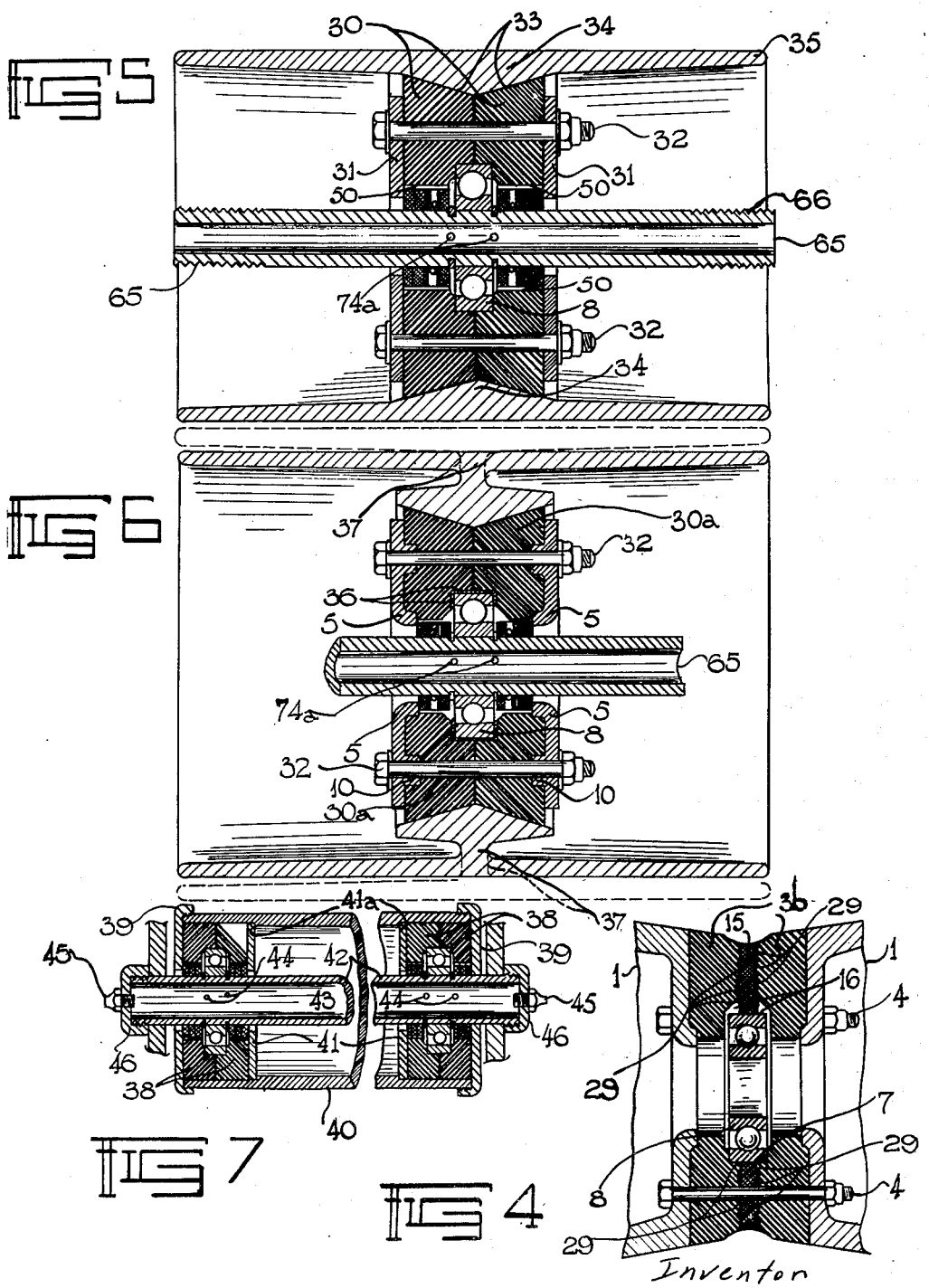

Aug. 11, 1953 T. WATT 2,648,577
MOUNTING OF BALL BEARING
Filed Nov. 23, 1948 3 Sheets-Sheet 3
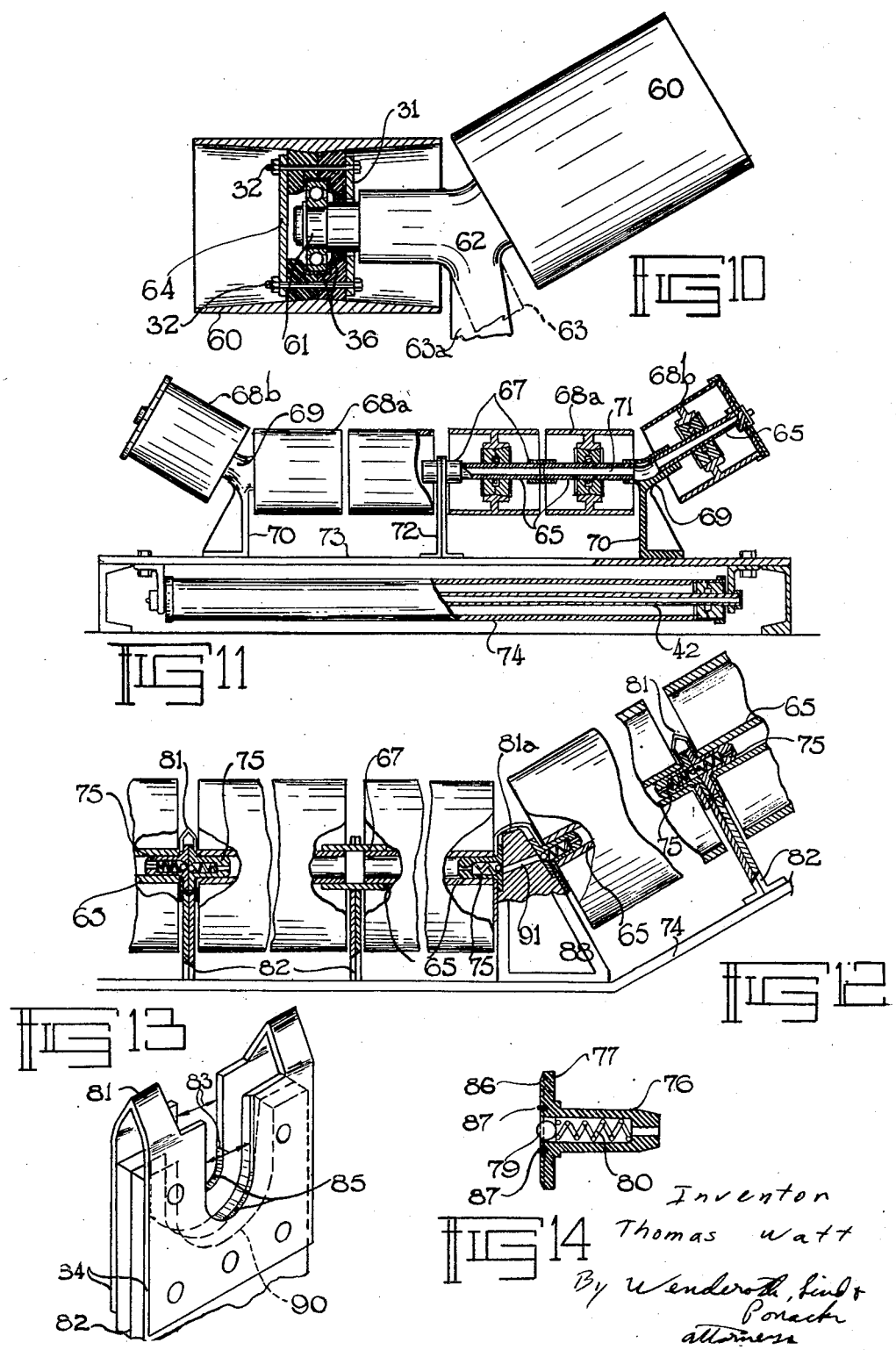

UNITED STATES PATENT OFFICE 2,648,577

MOUNTING OF BALL BEARING

Thomas Watt, Berea, Johannesburg, Transvaal,
Union of South Africa

Application November 23, 1948, Serial No. 61,664
In Great Britain November 25, 1947

10 Claims. (Cl. 308—184)

This invention relates to improvements in the mounting of antifriction ball or roller bearings and to bearing assemblies formed therewith, and is a development of certain known constructions.

According to one of said known constructions a ball or roller bearing is mounted in a rigid housing by means of a split bushing of rubber or like resilient material which encircles said bearing and which is a tight fit in an accommodating recess in said housing, whereby the outer race of the bearing is resiliently gripped in such a manner that, while it is prevented from rotating, the bearing as a whole is given a self-aligning characteristic. The bushing, made up of two co-acting half parts, is annular in form as is also the recess in the housing in which it is accommodated. In cross-section the said recess is of arcuate or V-shape, whereby the tendency is for the bushing after insertion to be squeezed inwardly or contracted so that at all times it exerts resilient gripping action on the aforesaid outer race of the bearing. In a preferred construction the recess in the housing is annular in form and is part-spherical in cross-section to suit the correspondingly shaped periphery of the bushing.

The bushing may be split in a plane parallel with or at right angles to the axis thereof. The housing may be in one piece or it may be split similarly to the bushing and arrangements made for bolting or otherwise securing the two parts together after insertion of the bushing with the bearing in the accommodating recess.

According to one modification of this prior construction, the internal annular recess in the rubber or like bushing enclosing the outer race of the bearing, is lined in whole or in part with a rigid material such as metal.

These earlier constructions referred more particularly to the provision of bearing blocks or pedestals for the purpose of providing journals for rotating shafts, spindles and the like. The present invention refers more particularly to the application of the main principles of these known constructions, to bearings and bearing assemblies for pulleys, rollers, sheaves and like members which are arranged to rotate about fixed shafts, axles and the like.

According to the present invention therefore, the boss of a rotating member such as a pulley, roller, sheave or the like, comprises an assembly consisting of at least one ball or roller bearing which is located as regards its outer race in an annular recess in a bushing of resilient material, such as rubber, which bushing is split into two half parts and these parts are arranged to be clamped together in an axial direction between rigid clamping members to thereby resiliently nip and secure the outer race of said ball or roller bearing, and wherein connection between the boss assembly and the outer peripheral working surface of the rotating member, is made through one or both of the rigid clamping members or through the resilient bushing.

According to one construction, one or both of said clamping members is or are connected directly to or is or are formed as an integral portion or portions, of the outer peripheral part or parts of the rotating member, which outer peripheral part or parts may be arranged parallel with, or set at any angle to, the axis of the bearing.

In the case of a roller, pulley or sheave for instance, the clamping members are in the form of an annulus shaped part formed integrally with flanges which constitute the peripheral surface or faces of the pulley or roller or the sheave respectively. Bolts or the like passing through said parts and the bushing in a direction parallel with the axis of the bearing, provide the means for applying the clamping pressure to compress the bushing parts so as to nip the outer race of the ball or roller bearing between them.

In the case of a guide roller or sheave for a rope or cable, having a single central bearing, an outer peripheral portion of the bushing is arranged to fill a space between the inner ends of the two outer flange parts forming the periphery or flanges of the roller or sheave and thereby to provide a resilient contact wearing surface for the rope or cable. In this manner the bushing fulfils a dual purpose.

Preferably the said disc-shaped clamping members formed integrally with the outer peripheral parts of the rotating member, are provided with one or more annular grooves or recesses in their inner surfaces or edges to receive dust-excluding sealing rings.

According to another construction, a resilient connection is made between the boss assembly and the outer peripheral part or parts of the rotating member, by arranging for the outer peripheral portion of the bushing to be caused to expand in a radial direction outwardly against the inside surface or surfaces of said outer peripheral part or parts when the bushing is compressed in an axial direction between the said clamping members, whereby a rotating member such as a roller or pulley is given resilient self-aligning and self-centering characteristics.

In this case the outer part or parts of the rotating member, or at least the inner surface portion to which the boss assembly is to be connected, is or are tubular in form and is or are provided with one or more annular projections or grooves to prevent axial displacement after the connection has been made. It will be understood that the axial clamping action causes a certain amount of "flow" of the resilient material of the bushing in a radial direction whereby the outside diameter or peripheral dimension thereof is increased, which increase in diameter or expansion of the bushing is employed to form a secure resilient frictional connection between the boss assembly and the outer part of the rotating member. This construction is particularly applicable to the rollers and pulleys of belt conveyors. The clamping members are preferably in the form of annular metal discs or plates which are secured by bolts passing therethrough, and through the resilient bushing.

In order that the present invention may be clearly understood and carried into practice, reference will now be made to the accompanying drawings in which like reference numerals refer to like parts throughout the several views.

In the drawings—

Figure 1 is a longitudinal cross-section of a rope guide roller constructed according to the present invention;

Figure 2 is a view similar to Figure 1, showing a modified form of construction of a rope roller;

Figure 3 is a cross-section on line III—III of Figure 2;

Figure 4 is a fragmentary longitudinal cross-section of a rope roller substantially similar to the construction shown in Figure 2, but embodying a modified form of construction;

Figures 5 and 6 are longitudinal cross-sections of two modified forms of construction of a conveyor belt roller constructed according to the present invention;

Figure 7 is a fragmentary longitudinal cross-section of a wide roller incorporating two bearing assemblies;

Figure 8 is a fragmentary cross-section, drawn to an enlarged scale, of lubricant sealing means for rollers or the like constructed according to this invention;

Figure 9 is a view similar to Figure 8, showing modified sealing means;

Figure 10 is a sectional elevation showing a form of mounting conveyor belt rollers constructed according to the present invention;

Figure 11 is a fragmentary sectional elevation of a complete conveyor belt roller assembly and mounting, complete with conveyor belt return roller constructed according to the invention;

Figure 12 is a fragmentary sectional elevation of a modified construction of conveyor belt roller assembly constructed according to the present invention;

Figure 13 is an isometric view of a roller connecting and locating bracket constructed according to the present invention; and Figure 14 is a longitudinal cross-section of a roller locating and lubricant valve element.

Referring to Figure 1 of the drawings, the rope guide roller comprises two co-acting hollow frusto-conically-shaped half parts 1 having inwardly projecting flanges 2 which form the annular shaped clamping members between which the two bushing parts 3 are clamped by means of bolts 4. The inner edges of flanges 2 are provided with annular projections or lips 5 which are adapted to engage the lubricant seals located between the inner curved surfaces of the bushing parts 3 and the shaft 6 of the roller. Each bushing part 3 is provided with an annular groove 7 or annular rebate in its inner face which with the groove or rebate of the co-acting bushing part forms an annular channel in which the outer race of ball bearing 8 is tightly located. The ball bearing 8 is located on the shaft 6 by means of circlips 9. The flanges or clamping parts 2 are provided with pops 10 or the like which engage in corresponding depressions provided in the outer faces of the bushing parts 3. The outer curved surfaces 59 of bushings 3 are preferably tapered and grooved to form a central rope locating hollow in the roller.

The shaft 6 of the roller is hollow to form a lubricant reservoir 11 which communicates with the lubricant chamber provided around the ball bearing in the bushing parts 3 by means of a plurality of radial ducts 12. The ends of the hollow shaft 6 are closed off by elements 13 which in addition form the shaft support. The reservoir 11 is charged with lubricant through suitable nipples 14 which, if desired, may be substituted by a suitable spring loaded grease cup.

Referring to Figure 2, the rope roller is substantially similar to the roller shown in Figure 1, but is in addition provided with an annular felt packing 15 located between the co-acting bushing parts 3a to form a radial lubricant passage from the lubricant chamber to the rope passing over the roller for purposes of lubricating the rope. The bushing parts 3a are provided with radial ducts 16 for forming passages for the lubricant to the felt packing 15. The lubricant passes through the packing 15 due to centrifugal and capillary action, or in the case of pressure lubrication by the pressure of the lubricant.

The shaft of the roller and lubrication system may be similar to that shown in Figure 1, but in Figure 2 a modified shaft and lubricating system is illustrated. The shaft shown in Fig. 2 comprises two hollow tubular parts 17 connected together by a centre boss part 17a on which the ball bearing 7 is mounted and located by circlips 9. In the outer ends of parts 17 the supports 13 are fixed thus forming two totally enclosed lubricant reservoirs 11a. On the shaft parts 17 lubricant reservoirs 18 are fixed by any suitable means such as by welding. Said lubricant reservoirs 18 are of substantially frusto-conical shape and divided into a plurality of compartments 19 by radial walls 20. The lubricant reservoirs 18 are located internally of the flared roller half parts 1 and are adapted to have their outer curved surfaces located in spaced relationship to the concentric inner curved surfaces of the flared roller parts 1. Each compartment 19 is provided with holes 21 in the hub part 22 and which are adapted to correspond with radial holes 23 provided in the tubular shaft parts 17. All the compartments 19 are further inter-connected by ports 24 (or 25 if desired) provided in the radial walls 20. The reservoirs 11a are connected to the lubricant chamber, formed in the bushings 3a, by ducts 26. On canting or tilting of the roller, when the rope moves side-ways from its locating groove or hollow 27, the peripheral flanges of the roller half parts 1 frictionally contact one or other of the lubricant reservoirs 18 which are then partly rotated thereby together with the shaft in order to bring another compartment 19 to the top for supplying lubricant to the reservoirs 11a. The arrangement is such that lubricant will drain from the upper compartments to a compartment located at the bottom through the ports 24, so that a fresh supply will thus become available for charging into the reservoirs 11a when a full compartment is rotated to the top. The supply of lubricant to reservoirs 18 is replenished through nipples 28 or other suitable means. Although two lubricant reservoirs 18 are illustrated, one only can be employed if desired. Where only one lubricant reservoir 18 is employed, the rotation thereof will be affected by the engagement of its under surface by the flared roller part 1 when the rope moves from its locating groove 27 in a direction away from the lubricant reservoir 18.

In order to prevent excessive amounts of lubricant from escaping along the joint formed between the packing 15 and the bushing 3a, the adjoining surfaces of the bushing parts 3b (see Figure 4) are provided with a plurality of concentric corrugations 29 to eliminate a straight passageway for the lubricant. Normally, the packing 15 will mould itself to the configuration of the corrugations 29 of the bushings 3b but, if desired, the packing ring 15 may also be pre-moulded to fit the corrugations.

Figure 5 illustrates a conveyor belt roller or pulley, generally termed idlers, constructed according to the simplest construction of the present invention. In this construction two identical rubber bushing parts 30 are clamped together between two annular clamping elements 31 by means of bolts 32. Such bushings 30 are also provided with bevelled outwardly directed curved surfaces 33, which form a substantially wide V-shaped annular recess when the bushings 30 are clamped together. On tightening of the bolts 32 the rubber of the bushings 30 will flow outwardly and inwardly thus causing increase and decrease of the outer and inner diameters of the bushing respectively. The decrease of the inner diameter increases the engagement on the ball bearing 8, while the increase of the outer diameter produces frictional engagements of surfaces 33 with the V-shaped annular protrusion 34 of the tubular roller casing 35. The annular protrusion 34 is provided centrally on the inner surface of the tubular casing 35 tapered correspondingly to the surfaces 33 of the bushings 30. The protrusion 34 is formed integrally with casing 35 and consists merely of a thickening of the central internal part of such casing.

In the modified construction of the roller or idler shown in Figure 6 the clamping elements 31a are provided with pops 10 or the like and inwardly directed lips or protrusions 5 substantially similar to those shown in Figures 1, 2 and 4. The bushings 30a are provided in the annular ball bearing groove with a pair of co-acting inner casings 36 in which the ball bearing outer race is housed. The inner casings 36 may also be provided in one of the bushings of the hereinbefore described assemblies.

In order that standard size bushings may be employed in rollers or idlers of larger diameters, the protrusion 34 is connected by a web piece 37 to the central portion of the inner surface of a larger sized tubular casing. This is clearly shown by full and also by broken lines in Figure 6.

In Figure 7 a wide roller is shown which has a ball bearing at each end. In this particular construction the clamping of the bushing 38 is effected by clamping means which consists of outer annular cover elements 39 which are screwed over (or into if so desired) the ends of the tubular casing 40. The clamping cover elements 39 clamp the bushings 38 against inner annular discs 41 which in turn engage the shoulders 41a formed by annular recesses provided in ends of the tubular casing 40. Each ball bearing 8 is located in a pair of co-acting bushing parts 38 substantially similar to the bushing parts 30 described herebefore, but have their outer curved surfaces perpendicular to their faces. The ball bearings 8 are mounted on the hollow stationary shaft 42 which forms internally a lubricant reservoir 43. Reservoir 43 communicates with the lubricant chambers around the ball bearings by a hole 44 while nipples 45 or the like are provided in the end covering members 46 of the tubular shaft 42 for filling of the reservoir.

Sealing means to prevent escape of lubricant from the lubricant chambers along the shaft consist of a plurality of felt or like material washers 47 fixed to the stationary shaft 6 by means of circlips 48 or other suitable means and metal washers 49 which engage the inner curved surfaces 50 of the bushings 3, 3a, 3b, 30, 30a or 38, and by which surfaces they are held due to the inward flow of the rubber when the bushings are clamped by bolts 4 or 32. Said washers 49, which are adapted to rotate with the bushings, extend between adjacent felt washers 47 to a limited extent and with which they are held in rubbing engagement. This sealing arrangement is clearly shown in the Figure 8 but also in Figures 7 and 10. It will be understood that such lubricant sealing arrangement is provided on both sides of the ball bearing 8, but if one end of the bearing is closed by a disc, as is shown in Figure 10, said sealing means will be required on one side only.

In a modified lubricating sealing arrangement shown in Figure 9 (also shown incorporated in Figures 1, 2, 5 and 6), three felt washers 47 are provided which are fixed to the stationary shaft while a spring forced annular lubricating seal 51 is interposed between two adjacent washers 47. The spring forced annular lubricant seal 51 consists of an annular metal casing 52 open along its inner curved surface and locating interiorly thereof a leather or other special resilient annular element 53 which is of L shape cross-section and which has an annular tension spring bearing on that portion which is located co-axially with and in close engagement with the shaft to ensure constant bearing and sealing engagement of such element with the shaft. Said spring forced seal is adapted to be tightly held by the surfaces 50 of bushings due to the inward flow of the bushing material in order to rotate with the said bushing as is the case with the metal washers 49 of which two are also provided.

It should be understood that number of felt washers 47 and metal washers 49 as well as the number of spring forced annular lubricating seals 52 may be varied to suit the particular roller and circumstances under which they are employed.

In Figure 10, an application of conveyor belt rollers or idlers, of the kind illustrated in Figure 5, is shown. In this arrangement two rollers 60 are mounted on a pair of stub axles 61 having the axles located at an obtuse angle with one another but in a common vertical plane. Said stub axles 61 are mounted on a pedestal 62 which in turn is fixed to a suitable base. In practice two of such pedestals 62 will be mounted on a single base with the horizontal pair of stub axles in line with one another so that the inclined end rollers will support the sides of the conveyor belt at angles to the centre part which will be located horizontally so that a substantially trough shaped conveyor belt is formed. In the case of a narrow conveyor belt the stub axles may be arranged at equal obtuse angles to the support or column 63 (in a broken line on Figure 10) instead of having one of the rollers arranged substantially at right angles to the support 63a, so as to provide a substantially Y-shaped pedestal which deforms the normally flat conveyor belt to substantially widened V-shape.

Instead of providing lubricant seals on the free ends of the stub axles 61, a circular plate 64 may be used for an annular plate 31 on the said end so that the end of the bearing is closed off. In cover plate 64 of the roller mounted at an incline, a grease nipple or the like is provided for introducing grease into the space formed behind said plate, while a lubricant duct, provided in the head of the pedestal, conveys the lubricant to the other roller.

Figure 11 illustrates the general arrangement of conveyor belt rollers or idlers. In this figure idlers are shown constructed substantially as illustrated in Figure 6. The hollow shafts 65 are provided with screw threaded ends 66 which are coupled together by known pipe connectors or sockets 67, while the ends of the shaft of rollers 68a and 68b are secured in the sockets provided in the hollow heads 69 of supporting columns 70. The free ends of the shafts of rollers 68b are closed to form a continuous lubricant reservoir 71 which is charged through suitable nipples or the like. The lubricant is fed to the roller bearings from the reservoir 71 through ducts 71a. The shafts of the horizontally shaped disposed rollers are supported by support columns 72 which extend upwardly from the base 73 between adjacent rollers. The belt return roller 74 is supported below the base 73 and is of the kind shown in, and described with reference to Figure 7.

A modified means of supporting and lubricating the roller is shown in Figure 12. In this construction, which permits for the ready withdrawal and replacement of any one roller without upsetting adjacent rollers, the end of each roller shaft 65 is adapted to locate in a rigid fashion, a locating element 75 which incorporates a lubricant passage having spring controlled valve means. Said locating element 75 comprises a hollow cylindrical shank part 76 and a flanged head part 77.

Said head part 77 of each element 75 is provided with a shoulder portion 78 on its rear face so that the flange proper will be located in spaced relationship to the end of the shaft into which the element is fixed. The lubricant passage valve consists of a ball 79 which is biased by a spring 80 to its closed position. A co-acting locking bracket 81, which is fixed to a column or support 82, consists of an inverted U-shaped element which is provided in the centre part of the bent-over portion with an opening through which the flanged heads 77 of the locating element 75 pass. A downwardly extending slot 83 is provided in each parallel limb 84 of the locking bracket 81. Each slot 83 is equal in width to the diameter of the annular shoulder 78 and is curved at its bottom 85 to form a support for the shoulder 78, while the flange 77 engages the inner surface of the said parallel limbs 84 adjacent to slot 83. The spacing between the parallel limbs 84 is substantially equal to double the thickness of a flange 77 so that on insertion of two locating elements 75, the faces 86 of the flanges will be in sliding engagement with one another, while the lubricant passages become aligned with one another. In the aligned position of the passages, the ball valves 79 will be depressed to the maximum extent (which is limited by suitable stop means) to form a continuous passage from one locating element to the other. Each locating element 74 is provided in the face 86 with an annular resilient lubricant sealing packing 87 to prevent the escape of lubricant along the co-acting surfaces 86. The edges of the flanges 77, and the free ends of the shank parts 76 are bevelled to facilitate the insertion of adjacent coacting elements 75 in the brackets 81 and also of inserting the elements 75 in the shafts 65 respectively.

Preferably the brackets 81 are adapted to be riveted to columns 82; the top end of such part being provided with a semi-circular recess 90 to receive the flanged heads 77 of the roller locating element 75. The semi-circular recesses 90 in the top ends of supports 82 also permit the supporting of adjacent rollers which are connected by a socket 67 (see Figure 12).

For purposes of locating adjacent rollers at angles with respect to one another, a bracket 81a is employed which has its limbs set at suitable angles with respect to one another. Said bracket 81a is fixed to a support 88 having shallow slots 89 for receiving the flanged heads 77 of the element 75; the faces of said flanged heads slidably engage the surfaces of said slots opposite the bracket slots 83. A lubricant passage 91 is provided in the supports 81a which is arranged to be slightly off-aligned with the passage of the locating elements 75 in order to prevent the closing of the ball valve 79 when the elements 74 are in their final position. The arrangement and construction shown in Figure 12 is fragmentary only, but the general arrangement will be like that as shown in Figure 11.

In the simplest form of brackets 81, each bracket may consist of two separate plates which are fixed to the columns 82. Each plate being, of course, provided with the vertical slot 83 which forms inwardly directed flanges for engaging behind the flanged head parts of the locating elements.

What I claim is:

1. An improved self-aligning bearing assembly for a rotating member such as a pulley, roller, sheave and the like consisting of a boss and a peripheral working surface, said boss comprising an assembly consisting of a single antifriction bearing having an outer race, a bushing of a resilient material having an annular recess, said outer race being inserted in and substantially enclosed by said annular recess, said bushing being split into two half parts and the said parts being arranged to be clamped together in an axial direction, rigid clamping members clamping said bushing parts therebetween said bushing parts resiliently nipping and securing the outer race of the bearing therebetween, said bushing parts forming a resilient core piece separating the clamping members from one another and preventing direct contact therebetween and wherein connection between said boss assembly and the outer peripheral working surface of the rotating member is made through the said clamping members.

2. An improved bearing assembly as claimed in claim 1, and wherein said clamping members are formed to provide an integral portion of the outer peripheral working surface of the rotating member.

3. An improved bearing assembly as claimed in claim 1, and wherein the clamping members are each in the form of an annulus-shaped part formed integrally with flanges which constitute between them the peripheral working surface of the rotating member, and wherein bolts pass through said parts and the bushing in a direction parallel with the axis of the bearing, said bolts comprising means for applying clamping pressure to compress the bushing parts so as to nip the outer race of the bearing between them.

4. An improved bearing assembly as claimed in claim 1, and wherein the rotating member has a single central bearing, an outer peripheral portion of the split bushing being arranged to fill a space between the inner faces of the two clamping members thereby to provide a resilient contact wearing surface for a rope or cable, whereby the bushing fulfills a dual purpose.

5. An improved bearing assembly as claimed in claim 1, and wherein the said clamping members are provided with annular projections on their inner surfaces to locate dust-excluding sealing rings.

6. An improved bearing assembly as claimed in claim 1, and wherein the boss assembly is used as a roller with the outer peripheral portion of the bushing providing the wearing surface of said roller, for which purpose the peripheral portion is arranged to stand proud of the clamping members.

7. An improved bearing assembly as claimed in claim 1, and wherein the rotating member has a single central bearing, an outer peripheral portion of the split bushing being arranged to fill a space between the inner faces of the two clamping members thereby to provide a resilient contact wearing surface for a rope or cable, whereby the bushing fulfills a dual purpose and wherein a radially disposed passage is provided in the clamped bushing parts of the rotating member, and being filled with a porous packing, the inner end portion of said packing being arranged to be in communication with a lubricant space of the bearing, so that due to capillary action and centrifugal force, lubricant is caused to flow in radial directions at a controlled rate through said packing to the periphery of the rotating member, and by contact, it is applied to a rope or cable, the rate of flow of the lubricant through the packing, being dependent upon the value of the centrifugal force, and consequently the speed of rotation and diameter of the rotating member, the viscosity of the lubricant, the porosity and aggregate cross-sectional dimensions of the packing, and the pressure of the lubricant at the inner end portions of the packing and its rate of supply thereto.

8. An improved bearing assembly as claimed in claim 1, and wherein the rotating member has a single central bearing, an outer peripheral portion of the split bushing being arranged to fill a space between the inner faces of the two clamping members thereby to provide a resilient contact wearing surface for a rope or cable, whereby the bushing fulfills a dual purpose and wherein a radially disposed passage is provided in the clamped bushing parts of a rotating member, and being filled with a porous packing, the inner end portion of said packing being arranged to be in communication with the lubricant space of the bearing, so that due to capillary action and centrifugal force, lubricant is caused to flow in radial directions at a controlled rate through said packing to the periphery of the rotating member, and by contact it is applied to a rope or cable, the rate of flow of the lubricant through the packing being dependent upon the value of the centrifugal force, and consequently the speed of rotation and diameter of the rotating member, the viscosity of the lubricant, the porosity and aggregate cross-sectional dimensions of the packing, and upon the pressure of the lubricant at the inner end portions of the packing and its rate of supply thereto and wherein the space of the joint between the clamped bushing parts is filled with porous packing to provide the aforementioned radially disposed passages for the flow of lubricant, which packing is of flat ring form and is clamped between the bushing parts.

9. An improved bearing assembly as claimed in claim 1, and wherein sealing means to prevent escape of the lubricant from the lubricant space are provided, said means being in the form of an annular chamber in which the bearing is located and consisting of a plurality of sealing washers of felt, which are fixed to the stationary shaft on which the rotating member is mounted, and a plurality of spaced metal washers which are fixed to and rotate with the boss of the rotating member, and which project part way between the sealing washers whereby a labyrinth gland effect is obtained.

10. An improved bearing assembly as claimed in claim 1, and wherein the rotating member is mounted on a stub axle, one clamping member being adapted to completely close off one side of a bushing to form a grease reservoir.

THOMAS WATT.

References Cited in the file of this patent

UNITED STATES PATENTS

| Number | Name | Date |
|---|---|---|
| 1,598,157 | Seibel | Aug. 31, 1926 |
| 1,603,671 | Epton | Oct. 19, 1926 |
| 1,757,539 | Minor | May 6, 1930 |
| 2,070,081 | Henry | Feb. 9, 1937 |
| 2,329,901 | Herrington | Sept. 21, 1943 |
| 2,365,875 | Hersey | Dec. 26, 1944 |

FOREIGN PATENTS

| Number | Country | Date |
|---|---|---|
| 528,648 | Great Britain | Nov. 4, 1940 |